United States Patent
Sen et al.

(10) Patent No.: US 9,766,869 B2
(45) Date of Patent: Sep. 19, 2017

(54) PARAMETERIZED INSTALLATION PACKAGES

(75) Inventors: Vijay Sen, Redmond, WA (US); Clea Allington, Bellevue, WA (US); Carlos Aguilar Mares, Snoqualmie, WA (US); Bilal Alam, Sammamish, WA (US); Saad Ladki, Bellevue, WA (US); Nina Tang, Kirkland, WA (US); Madhur Joshi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 999 days.

(21) Appl. No.: 12/355,471

(22) Filed: Jan. 16, 2009

(65) Prior Publication Data

US 2010/0186009 A1    Jul. 22, 2010

(51) Int. Cl.
*G06F 9/445*    (2006.01)

(52) U.S. Cl.
CPC ........................... *G06F 8/61* (2013.01)

(58) Field of Classification Search
CPC ................................. G06F 8/60–8/71
USPC ................................. 717/168–178
See application file for complete search history.

(56) References Cited

U.S. PATENT DOCUMENTS

| | | | | |
|---|---|---|---|---|
| 5,247,683 A * | 9/1993 | Holmes et al. | ............... | 709/221 |
| 5,717,930 A * | 2/1998 | Imai et al. | ............... | 717/176 |
| 5,960,204 A | 9/1999 | Yinger et al. | | |
| 6,006,035 A * | 12/1999 | Nabahi | ............... | G06F 8/61 |
| | | | | 709/221 |
| 6,066,182 A * | 5/2000 | Wilde et al. | ............... | 717/175 |
| 6,131,192 A * | 10/2000 | Henry | ............... | G06F 8/61 |
| | | | | 707/999.101 |
| 6,381,742 B2 * | 4/2002 | Forbes | ............... | G06F 8/61 |
| | | | | 707/999.202 |
| 6,604,236 B1 * | 8/2003 | Draper | ............... | G06F 8/66 |
| | | | | 707/E17.01 |
| 6,681,391 B1 * | 1/2004 | Marino et al. | ............... | 717/175 |
| 6,892,382 B1 | 5/2005 | Hapner et al. | | |
| 7,210,143 B2 * | 4/2007 | Or et al. | ............... | 717/174 |
| 7,234,118 B1 * | 6/2007 | Bleizeffer | ............... | G06F 9/44505 |
| | | | | 715/764 |
| 7,266,817 B1 | 9/2007 | Barrett | | |
| 7,293,255 B2 * | 11/2007 | Kumar | ............... | G06F 9/4446 |
| | | | | 714/4.11 |

(Continued)

OTHER PUBLICATIONS

"Packaging Applications in Software Distributor Format Using Software Package Builder", Retrieved at<<http://docs.hp.com/en/5187-4539/5187-4539.pdf>>, pp. 22.

(Continued)

*Primary Examiner* — Francisco Aponte
(74) *Attorney, Agent, or Firm* — Fiala & Weaver P.L.L.C.

(57) ABSTRACT

An installation package may have metadata concerning optional parameters for a software package to be installed. The metadata may be read by an installation system, and a user interface presented to a user for input on the parameters values. The installation system may store the parameters for later replication of the installation. The installation system may perform the installation on a local device or a remote device, and may further be capable of presenting the user interface on another device. In some embodiments, the metadata may be available to the installation system without having to open the installation package.

20 Claims, 3 Drawing Sheets

(56) References Cited

U.S. PATENT DOCUMENTS

| | | | | |
|---|---|---|---|---|
| 7,340,520 | B1* | 3/2008 | Jordan | G06Q 30/04 709/201 |
| 7,523,452 | B1* | 4/2009 | Kamity | G06F 8/65 717/178 |
| 7,536,686 | B2* | 5/2009 | Tan | G06F 8/61 713/100 |
| 7,546,594 | B2* | 6/2009 | McGuire | G06F 8/68 717/168 |
| 7,600,225 | B2* | 10/2009 | Sliger | G06F 8/68 707/999.202 |
| 7,676,448 | B2* | 3/2010 | Henderson | G06F 8/65 709/203 |
| 7,827,549 | B2* | 11/2010 | Tarassov | G06F 8/60 717/147 |
| 7,844,964 | B2* | 11/2010 | Marolia | G06F 8/65 455/418 |
| 7,987,449 | B1* | 7/2011 | Marolia | G06F 8/68 709/220 |
| 8,117,293 | B1* | 2/2012 | Anderson | G06F 8/71 709/203 |
| 8,429,626 | B2* | 4/2013 | Lerum | G06F 8/60 717/100 |
| 8,495,622 | B2* | 7/2013 | Redpath | G06F 8/61 717/175 |
| 8,521,652 | B2* | 8/2013 | Foster | G06F 21/105 705/51 |
| 8,555,273 | B1* | 10/2013 | Chia | G06F 8/665 717/168 |
| 8,732,692 | B2* | 5/2014 | Fangmeier | G06F 8/60 717/174 |
| 2002/0062405 | A1* | 5/2002 | Ayyagari | 709/331 |
| 2002/0099726 | A1* | 7/2002 | Crudele | G06F 8/68 |
| 2002/0147974 | A1* | 10/2002 | Wookey | 717/176 |
| 2004/0059703 | A1* | 3/2004 | Chappell | G06F 8/61 |
| 2004/0169687 | A1* | 9/2004 | Zimniewicz et al. | 345/841 |
| 2004/0199572 | A1 | 10/2004 | Hunt et al. | |
| 2004/0243631 | A1* | 12/2004 | Walker et al. | 707/104.1 |
| 2005/0022175 | A1* | 1/2005 | Sliger | G06F 8/68 717/169 |
| 2005/0097225 | A1* | 5/2005 | Glatt | H04L 67/1095 709/248 |
| 2005/0235281 | A1* | 10/2005 | Lefrancois | 717/175 |
| 2006/0123414 | A1* | 6/2006 | Fors | G06F 8/61 717/177 |
| 2006/0136872 | A1 | 6/2006 | Barr et al. | |
| 2006/0230314 | A1* | 10/2006 | Sanjar | G06F 8/61 714/26 |
| 2006/0253631 | A1* | 11/2006 | Dietrich | G06F 17/30233 710/68 |
| 2007/0245340 | A1* | 10/2007 | Cohen et al. | 717/174 |
| 2007/0271552 | A1* | 11/2007 | Pulley | G06F 8/60 717/120 |
| 2007/0283344 | A1 | 12/2007 | Apte et al. | |
| 2008/0127169 | A1* | 5/2008 | Malasky et al. | 717/174 |
| 2008/0127175 | A1* | 5/2008 | Naranjo | G06F 8/61 717/174 |
| 2008/0134045 | A1* | 6/2008 | Fridman | G06F 8/60 715/735 |
| 2008/0320468 | A1* | 12/2008 | Ferris | G06F 8/61 717/174 |
| 2009/0119660 | A1* | 5/2009 | Redpath | 717/175 |
| 2009/0164989 | A1* | 6/2009 | Schwalbe | G05B 19/042 717/178 |

OTHER PUBLICATIONS

"ViaMichelin", Retrieved at<<http://business.viamichelin.co.uk/b2b/webpackage_uk.html>>, Oct. 20, 2008, pp. 3.

"How to Create, Package, and Deploy a MapXtreme 2004 Application", Retrieved at<<http://reference.mapinfo.com/software/mapxtreme_windows/english/2004/MapXtreme2004_Develop.pdf>>, 2004, pp. 1-20.

"Developing Applications with WebLogic Server", Retrieved at<<http://edocs.bea.com/wls/docs90/programming/libraries.html>>, Oct. 20, 2008, pp. 10.

"EMCO MSI Package Builder—Overview", Retrieved at<<http://www.emco.is/products/msi-package-builder/features.php>>, Oct. 20, 2008, pp. 3.

"Packaging Applicants in Software Distributor Format Using Software Package Builder", retrieved at <<http://docs.hp.com/en/5187-4539/5187-4539.pdf>>, Sep. 2003, 22 pages.

* cited by examiner

PARAMETERIZED INSTALLATION PACKAGES

BACKGROUND

Installation of computer application packages can be complicated by many variations in hardware, previously installed software, and various options that may affect the operation of the computer application. In many cases, an installation process may have many different variables that may be defined by user input during an installation process.

In cases where an administrator may manage many different devices, the administrator may have to enter the same data at each time an application package is installed. The repetitive nature may introduce opportunities for mistakes and makes large deployments difficult to manage.

SUMMARY

An installation package may have metadata concerning optional parameters for a software package to be installed. The metadata may be read by an installation system, and a user interface presented to a user for input on the parameters values. The installation system may store the parameters for later replication of the installation. The installation system may perform the installation on a local device or a remote device, and may further be capable of presenting the user interface on another device. In some embodiments, the metadata may be available to the installation system without having to open the installation package.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
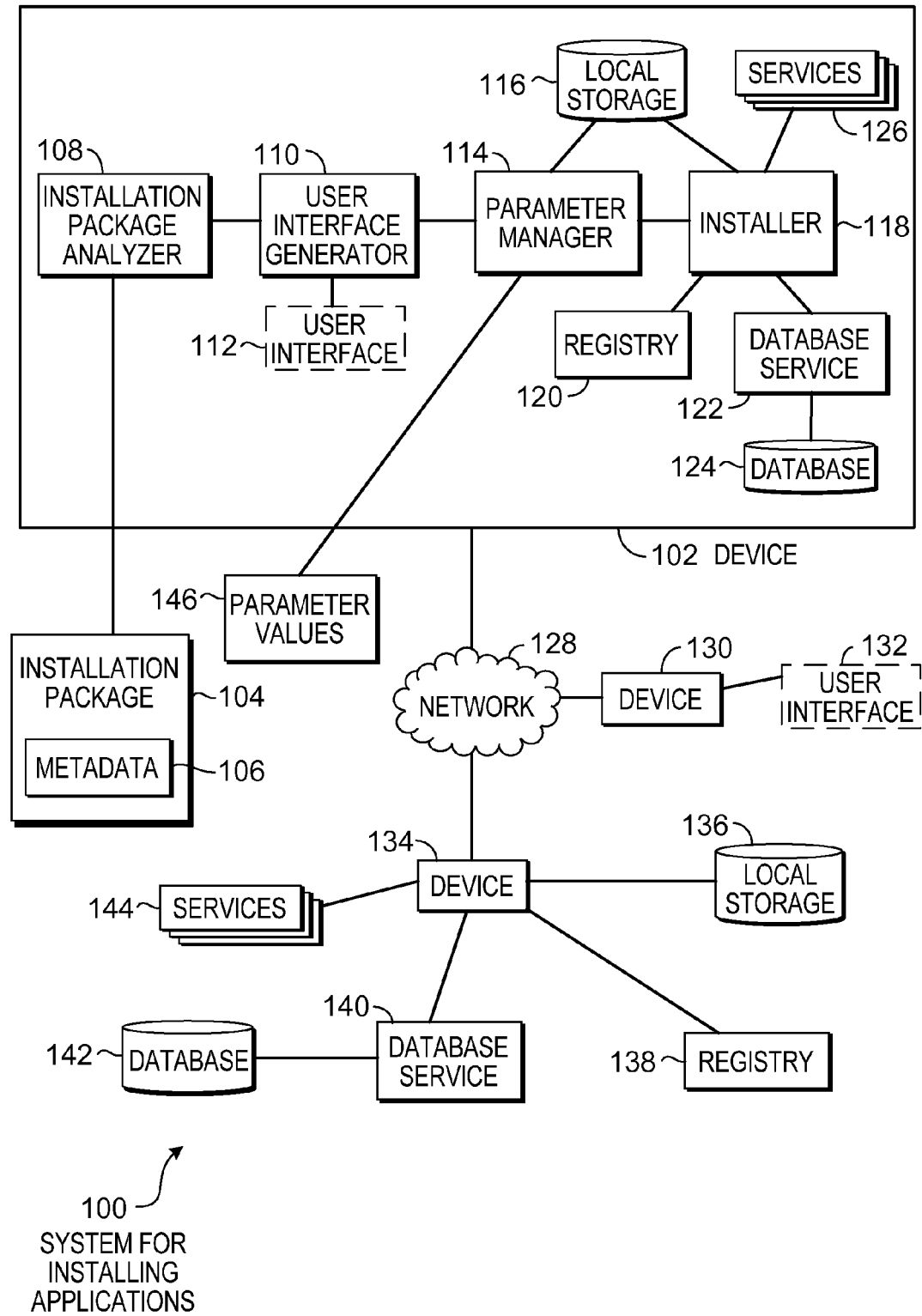
FIG. 1 is a diagram illustration of an embodiment showing a system for installing applications.

An application installation system may present modifiable parameters in a user interface, save the parameters, and use the parameters to install a software application. The application installation system may have multiple providers that contain functions, procedures, scripts, and other mechanisms for modifying many different types of files and systems, including text based files, database systems, and other stored information, including registry keys. The providers may serve as interfaces to the various elements that may be modified during an installation process.

The application installation system may scan an installation package to obtain metadata describing the modifiable parameters. In some embodiments, the installation package may have separately readable metadata, while in other embodiments, the installation system may open and scan an installation package to determine the modifiable parameters.

A user interface may be generated through which a user may enter values for the parameters. In many cases, default values or recommended settings may be presented. The installation system may use branching or have various dependencies defined that may launch specific activities or present different parameters to a user for input.

After collecting values for the modifiable parameters, the parameters may be stored. In some instances, a previously stored set of parameter values may be used to reinstall a package on the same or different hardware. The stored set of parameter values may be edited between installations in some cases.

The installation of the application may be performed using the parameter values. In addition to copying files and modifying registry keys and configuration files, the installation system may interface with database systems and other systems through the use of provider interfaces. The installation system may cause data stored in a database, for example, to be modified to particular settings.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for installing application packages. Embodiment 100 is a simplified example of the functional elements of an installation system that may perform complex installations on local or remote device.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates an installation system that may perform installation of application packages. The installation system may be a common platform that may be used to install and deploy applications on various devices, including creating a custom configuration and deploying that configuration across multiple devices.

The installation system may generate a user interface from changeable parameters found within an installation package. The changeable parameters may be any type of object, data value, database entry, configuration file, or other element that may be customized, changed, or set as part of the installation procedure.

A device 102 may host an installation system. In many embodiments, the device 102 may be a server computer or client computer on a network. In such cases, the installation system may be defined in executable instructions that are executed on a computer processor. In other embodiments, the installation system may be a hardware device that performs some or all of the functions described for the installation system in dedicated hardware devices, which may include specialized circuits or mechanisms, including application specific integrated circuits (ASIC), very large scale integrated circuits (VLSI), or other hardware components.

In some embodiments, some portions of the installation system may be performed by two or more different devices. In some cases, one device may perform some or all of one or more functions, while another device may perform some or all of the same or another function. In such cases, the devices may be connected by a network or some type of communication path.

An installation package 104 may contain some or all of the information that may be used to install an application. In many cases, the installation package may contain various files that may be used by an application, including executable files, data files, configuration files, and other components, such as registry settings, database entries, and database scripts. Some installation packages may include such files in a compressed or uncompressed state.

The installation package 104 may include metadata 106 that may include descriptions of or information pertaining to configurable parameters in the installation package 104. The metadata 106 may be used by an installation system in various manners, including preparing a user interface and handing user input, as well as defining how and where changes to configurable parameters may be implemented.

The changeable parameters may be defined using types and permitted values, in some instances. For example, a changeable parameter may be defined as a string type with the name "Type Face" and with permitted values of "Large", "Medium", and "Small". In another example, a changeable parameter may be a real number with a range of 0.000 to 1.000. Yet another example may be an integer parameter with permitted values being any positive number. Some embodiments may include composite types that may be composed of several primitive types.

The metadata 106 may contain various information regarding changeable parameters. For example, the metadata 106 may include user-friendly descriptions of the changeable parameters so that a user interface may be created using the user-friendly descriptions rather than a variable name.

The metadata 106 may include scripts or other descriptions of how and where a changeable parameter may be updated. A script may, for example, be a query that is run against a database service to change a parameter in a database. Other scripts may be sequences of commands that may be executed within an installation system or using a shell or other external device for affecting a change to a parameter.

The metadata 106 may also include a sequence definition or dependencies of some changeable parameters on other changeable parameters. For example, the metadata 106 may include a sequence of changeable parameters for which values may be determined. Based on the values of one or more of the parameters, some parameters may be determined. A typical use of dependencies may be to generate a series of input screens for a user, and to create branching or other sequences based on the user input. For example, when a user selects specific value for one parameter, a second screen may be presented in the user interface for a second set of parameters. If a different value is chosen for the parameter, a different set of parameters may be presented in a subsequent screen.

In many embodiments, the metadata 106 may be readable within the installation package 104 without having to load the installation package in memory. Such embodiments may include the metadata 106 in a separate file from the installation package 104, or may have a header or other component with the installation package 104.

In some embodiments, the metadata 106 may not be separately available. In such embodiments, the installation package analyzer 108 may scan the installation package 104 to identify changeable parameters. The installation package analyzer 108 may search for parameters that are identified using tags or other identifiers within the installation package 104, and may generate some of the information defined on the metadata 106.

A user interface generator 110 may create one or more user interface screens using the metadata 106 and/or any metadata gleaned from the installation package 104 by the installation package analyzer 108. The user interface generator 110 may determine a sequence of configurable parameters and may layout a user interface screen that contains prompts or other descriptors for user input. The user interface generator 110 may present the user interface screen on a local user interface 112, through which a user may enter values, select options, or otherwise provide input.

In many embodiments, the user interface generator 110 may provide verbose descriptors, help text, or other information that may be presented to a user. For example, a changeable parameter named "XW_init" may have a text string "User Name" associated with the parameter. The text string may be presented on the user interface when soliciting input for the variable XW_init.

In embodiments where permissible values for a parameter are defined, the user interface generator 110 may present an input mechanism in a user interface screen that limits a user choice to those permissible values. For example, drop down list may be presented with permissible values populated within the drop down list. In another example, a set of permissible values may be presented with a set of radio buttons or check boxes for the user to select.

In many embodiments, the user interface generator 110 may provide checks on the input values and may process the input values to determine a value for a configurable parameter. In a simple example, a real number may be evaluated to determine if the number is within a permissible range. If the number is outside the range, the user interface may present an error message to the user and may force the user to re-enter the data.

In another example, a user interface generator 110 may analyze an input value and translate, process, or otherwise determine a value for a changeable parameter. In such an example, the value selected or input by a user may be changed or processed to determine the actual value for a changeable parameter. For example, a user interface screen may present a user with the option of a "Low" or "High" selection for a performance parameter. If the user selects "Low", a changeable parameter Priority with a real number data type may be set to 1.5. If the user selects "High", the same changeable parameter may be set to 7.

In more complex examples, a user interface generator 110 may present a series of questions that may be used to select a value for a particular changeable parameter. The metadata associated with a changeable parameter may include various algorithms, heuristics, or other mechanisms by which user input may be processed to determine a value for a changeable parameter.

The user interface generator 110 may provide checks to the user input to assure that the user input is proper. Proper user input may have a specific format, contain specific characters, or may comply with specific ranges of values. The user interface generator 110 may be capable of accepting a user input and provide proper formatting or otherwise changing the user input to comply with a desired format or content.

In some embodiments, the user interface generator 110 may use scripts or other mechanisms to select values or determine values. For example, a user interface sequence may include a shell script that may perform a query to determine a particular network setting, or may include a database query for retrieving a specific parameter value. The resultant value may be stored as a changeable parameter value with or without presenting the value to a user for confirmation or change.

A parameter manager 114 may receive parameters from a user interface and manage the storage and retrieval of changeable parameter values. After gathering user input and determining values for the changeable parameters, the values may be stored in a local storage system 116. The stored values may be used for subsequent re-installation operations, such as when an application is reinstalled on the same device or when the same configuration is used on other devices.

In many cases, a set of parameter values 146 may be used as suggested default values for an installation, where the default value may be overwritten or changed by a user during installation. In some cases, one or more of the parameter values 146 may be identified as a preset value that is not changeable by a user during installation.

The stored changeable parameter values may enable several scenarios for deploying applications across multiple devices. In one scenario, an administrator that manages several hundred computers for an enterprise may create a set of parameter values 146 that may be used to install an application on many different computers in the same configuration. In such a scenario, the parameter values 146 may completely define the variables for an application so that the installation process may proceed without user interaction. Such an installation may be distributed and executed, resulting in identically configured applications on multiple devices.

In another scenario, an administrator may create a set of parameter values 146 that contain changeable and unchangeable parameters. The unchangeable parameters may define, for example, specific values that enable an application to operate within the enterprise such as network configuration, server names, or other settings that may be constant across the enterprise. Another example of unchangeable parameters may be security settings, audit settings, or other configurations that may be dictated by company policy, legal considerations, accounting standards, national security, or other reasons. The changeable parameters may be values that can be changed by each user. The changeable parameters may be customized to suit a user's preference or may be changed to match specific hardware or software configurations of the device on which the application is being installed.

In still another scenario, a software vendor may distribute an application package with a set of parameter values 146 that define the feature set of the application. A user who purchases a basic configuration of an application may receive a set of parameter values 146 that permit only a subset of the entire application to be functional. When a user purchases the full version of the application, a different set of parameter values 146 may be distributed that may enable the user to experience the full capabilities of the application.

Such a scenario may be useful when multiple versions of an application may be manufactured and distributed. The application itself may be the same executable code, but the set of parameter values 146 may be different for each version of the application. In this manner, a single executable image may be created, tested, and distributed, while several sets of parameter values 146 may define the different versions of the application.

The set of parameter values 146 may be used to populate portions of a user interface that is presented to a user. For example, a default value for a particular parameter may be presented in a text input box within a user interface, where the default value came from the set of parameter values 146. In cases where the default value is changeable, a user may be able to select an alternate value. In cases where the default value is not changeable, the user may be able to view the value but not change the value. In some such cases, the value may not be presented to the user at all.

The parameter manager 114 may store the values for changeable parameters in a local storage 116. An installer 118 may perform an installation using the stored values for changeable parameters. In many embodiments, the installer 118 may be configured to operate without user intervention. In some embodiments, the installer 118 may show a progress bar or present status information as the installer 118 performs its functions.

The installer 118 may perform many different installation tasks. In many installation situations, the installer 118 may place various files in a local storage system 116. The files may be unpacked or expanded from a compressed state in the installation package 104. The files may be executable files, data files, configuration files, or any other type of file.

The installer 118 may update the registry 120 for the device 102. The installer 118 may also store data in a database 124 through a database service 122, and the installer 118 may also install and configure various services 126.

The installer 118 may customize various items using the values for the changeable parameters. For example, a registry setting may be changed to a value determined from user input or from stored set of parameter values 146. In another example, a configuration file may have a parameter that is changed to match a changeable parameter.

The installation system may have several mechanisms for interfacing with different components. For example, the installer 118 may have a database interface that may enable the installer 118 to transmit a database query or other instruction to the database service 122. The database instruction may include a command or sequence of commands for updating a record within the database 124 with a value from a changeable parameter. In another example, the installer 118 may have an interface to a service 126 that may enable the installer 118 to change a parameter or setting with the service 126.

The installation system may be used for installing complex applications. One example of a complex application may be a web application, such as a blogging application. A web application may operate in conjunction with several other services, such as Internet-based services, database services, and other services. When the web application is installed, various parameters may be set for the database service to interact with the web application, and various Internet-based services may be configured to link to or interact with the web application.

In the example of a blogging application, an interface may be configured between the blogging application and a database service 122. The database service 122 may store the blog entries and other data used by the blogging application. In order to configure the database service 122, the installer 118 may run scripts or other commands against the database service 122 to query or store data in the database 124 or configure the database service 122 to accept communication from the web service.

Continuing with the example of the blogging application, various Internet-based services may be configured to work with the blogging application. For example, a web page or HTTP service may transmit Hyper Text Transport Protocol (HTTP) documents when requests are received from the Internet. The HTTP service may be configured to receive requests for the blogging application and transmit the requests to the blogging application. The HTTP service may also be configured to receive information from the blogging application and transmit the information using HTTP to the requester.

Another service that may be configured for the blogging application example is an authentication service. The authentication service may manage a user's identity and may permit or deny certain functionality based on the user's credentials. The installer 118 may configure an interface with an authentication service so that users of the blogging application may be properly authenticated.

In some embodiments, the services that are accessed by the application being installed may be local services 126, or may be remote services. Remote services may operate on other devices connected to a local area network or a wide area network.

The installation system may have many different connections to remote devices. For example, the user interface generator 110 may generate a user interface that is displayed on a local user interface 112, such as a monitor attached to the device 102. In some instances, the user interface generator 110 may create a user interface that is transmitted across a network 128 and displayed on a user interface 132 attached to a device 130.

One such mechanism is for the user interface generator 110 to create an HTTP document representing the user interface, then to transmit the HTTP document to the device 130 and display the HTTP document as the user interface 132. When a user makes changes to a changeable parameter, the device 130 may send the user input to the user interface generator 110 to process the input and create other HTTP documents representing other user interface screens.

In one connection to remote devices, the installation system operating on device 102 may perform installation on a remote device 134. The installation system on device 102 may connect to the remote device 134 in various manners to cause the installation to be performed.

For example, the installation system may copy files to a local storage 136 attached to the remote device 134. The installation system may also modify the registry 138 for the remote device 134, and may interface with a database service 140 connected to a remote database 142. The installation system may also modify settings for various additional services 144 operating on the remote device 134.

The remote device 134 may have an application installed that executes on the remote device 134, but the installation system operates on a different device 102. The installation system on device 102 may push the installation to the remote device 134 by first instantiating a communication mechanism through the network 128. The communication mechanism may be configured with an authentication mechanism and other security mechanisms so that the installation system on device 102 may have administrative privileges or other permissions for installing on remote device 134, accessing registry settings, and performing other functions on remote device 134.

The example of installing a web application, as discussed above, may be applicable to remote applications as well. In many cases, a web server may be located remotely and may even be thousands of miles away from a user who wishes to install the web application. The user may operate an installation system on a local device 102 and cause the web application to be installed on a remote server, represented by remote device 134. The web application may be installed by configuring database service 140 and other services 144 on the remote device 134, as well as installing and configuring files that are stored on the local storage 136 for remote device 134.

Figure 2:
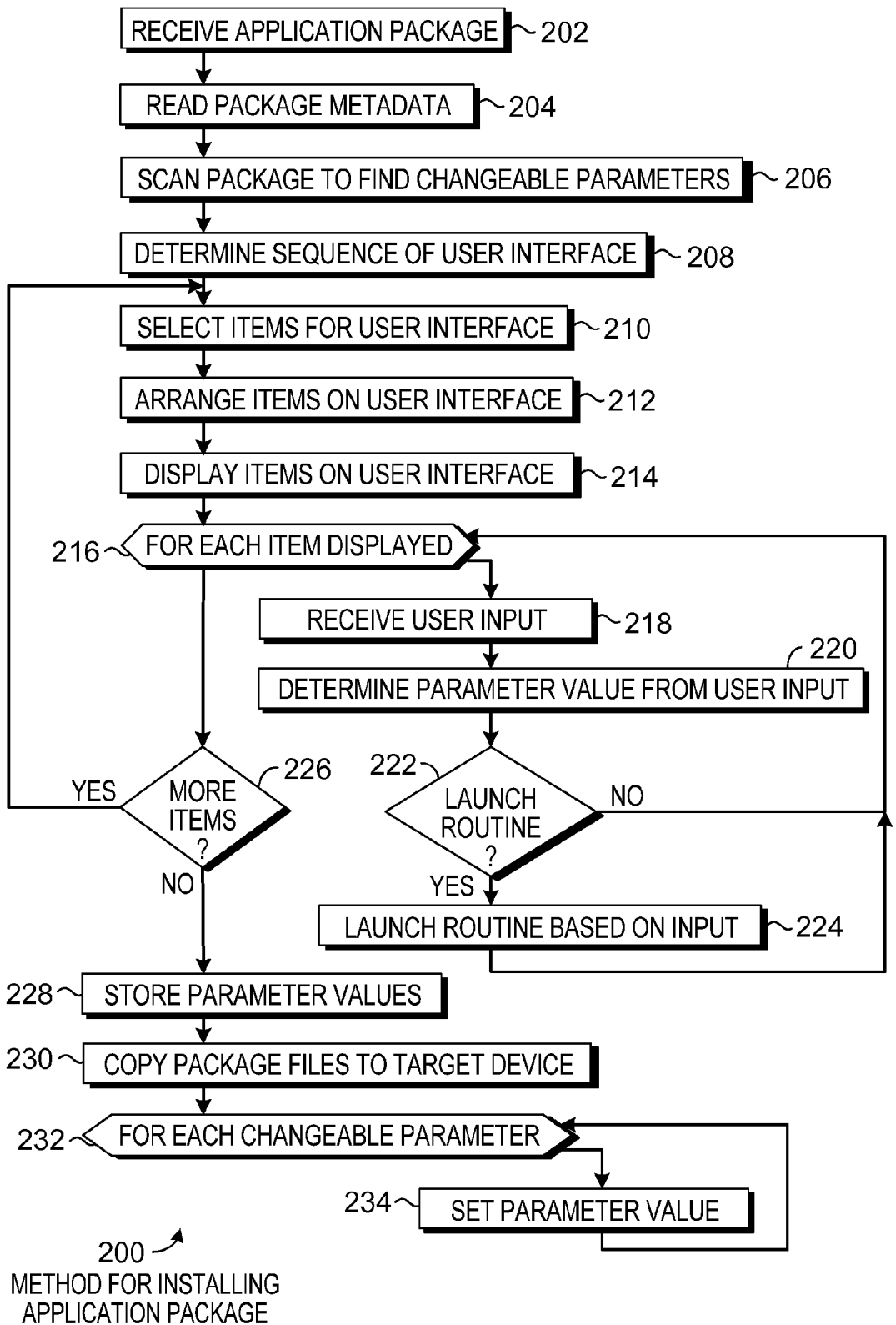
FIG. 2 is a flowchart illustration of an embodiment showing a method for installing application packages.

FIG. 2 is a flowchart illustration of an embodiment 200 showing a method for installing an application package. Embodiment 200 is a simplified example of merely one method for using an installation package to generate user interface screens, collecting data, and using the data to perform an installation.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one method by which an installation package may be used to install an application. Many of the steps of embodiment 200 may be performed by a generic installation system that may receive installation packages and perform installations for many different types of applications. In some embodiments, an installation system may perform installations for applications that are developed and manufactured by different software vendors or development teams.

The installation system uses metadata either provided separately or gathered from an installation package to gather user input from a user interface. Based on the input, a set of values for changeable parameters is created and stored. After copying files to the target device, the values of the changeable parameters are set in different services, databases, file systems, registries, and other storage mechanisms.

The application package may be received in block 202. In many embodiments, a set of metadata may accompany the application package. The metadata may be read in block 204.

For example, the metadata may be a separately readable element from an installation package. In many cases, an installation package may contain a large number of compressed files that may not be easily readable. In such a case, the metadata may be a portion of the installation package that is not compressed so that the metadata may be quickly read in block 204. In other cases, the metadata may be a separate file from an installation package.

In some embodiments, the installation package may be scanned to find changeable parameters in block 206. In such embodiments, some or all of the installation package may be scanned to locate changeable parameters that may be identified by tags or some marking mechanism.

In some cases, a portion of the metadata relating to the changeable parameters may be determined from metadata readable from the installation package and from metadata determined by scanning the installation package.

A sequence for the user interface may be determined in block 208. The sequence may be determined by identifying any dependencies between parameters, among other mechanisms. In some cases, the metadata may include a sequence or order for a user interface. In some such cases, the sequence of a user interface may be inferred by the sequence in which changeable parameters may be stored within the metadata.

In some embodiments, the metadata may include information that may be used to create a user interface. For example, a changeable parameter may have a descriptive name, text formatting information, layout information, and other information. In some cases, the metadata may include the type of input mechanism for a parameter, such as whether a checkbox, drop down list, radio button, text entry box, or some other user input mechanism is preferred for the parameter. Some metadata may describe groupings of changeable parameters that may be presented together.

In some embodiments, metadata may describe branches or other complex workflows for requesting and gathering user input. Some such workflows may have conditional arguments that request certain user input when one changeable parameter is a specific value. For example, a first changeable parameter may be whether or not a database is executing on the local device. If the changeable parameter is true, a series of questions about the database service may be presented to the user. If the changeable parameter is false, the questions may not be presented.

Items may be selected for the user interface in block 210 and arranged on the user interface in block 212. In some embodiments, metadata may include layout and arrangement information for user interfaces, in other embodiments, a default arrangement of user interface prompts may be created.

The user interface created in block 212 may be a screen or series of screens that are displayed on a user interface device in block 214. In some embodiments, several sequential screens of prompts may be presented to a user to collect data. In other embodiments, all of the changeable parameters may be presented in a single screen.

For each item displayed in block 216, user input may be received in block 218. From the user input, a parameter value may be determined in block 220.

In some embodiments, a user input may be interpreted, modified, changed, or otherwise processed to determine a value for a changeable parameter. For example, a registry value for a changeable parameter may be stored in hexadecimal format. However, the user input may be configured to receive decimal values as a convenience to the user. The processing in block 220 may change the user input into hexadecimal format.

In some embodiments, two, three, or more user inputs may be processed to determine a value for a changeable parameter. The example of embodiment 200 illustrates one method for collecting and processing user input, and the method of embodiment 200 is very serial and linear. Other embodiments may have more complex processes.

In some embodiments, a routine may be associated with a changeable parameter or a specific value for a changeable parameter. If such a routine is to be launched in block 222, the routine may be performed in block 224 and the method may return to block 216. If no routines are to be launched in block 222, the method may return to block 216.

An example of such a routine may be a script or executable code that may be executed when a specific value of a changeable parameter is received. In a simplified example, if a user input identifies a server device for a database service, the routine in block 224 may attempt to ping the server in block 224. In many cases, the routines that may be executed in block 224 may gather information or perform queries that may help in gathering information for the changeable parameters.

After processing the items in block 216, if more items are to be processed in block 226, the method may return to block 210 where another user interface screen may be generated and input collected.

If no more items are to be processed in block 226, the changeable parameter values may be stored in block 228.

After the changeable parameter values are stored in block 228, the installation process may commence. The installation process may include copying installation package files to a target device in block 230 and, for each changeable parameter in block 232, setting the parameter value in block 234.

The installation process may operate on a target device. In some cases, the target device may be the same device on which the installation system is operating. In other cases, the target device may be a remote device that is connected to the installation system through a network connection.

When the parameter value is set in block 234, an installation system may have many different mechanisms for setting the parameter value. For example, the installation system may have a shell in which scripts or other executable commands may be run to perform the parameter setting function. The installation system may have an interface to a database system and may send a query or set of commands to the database system to store information containing the changeable parameter in a database. The installation system may have a mechanism for reading, modifying, and storing registry settings for a local device or remote device. In still another example, the installation system may have an interface to specific services that may enable the installation system to set or configure various parameters with values from the changeable parameters.

One example of setting a parameter value in block 234 may be to modify a script with a parameter and run the script. Such a script may be a database script that interacts with a database and may set a value, recall a value, or configure the database service or the database itself based on the parameter.

Figure 3:
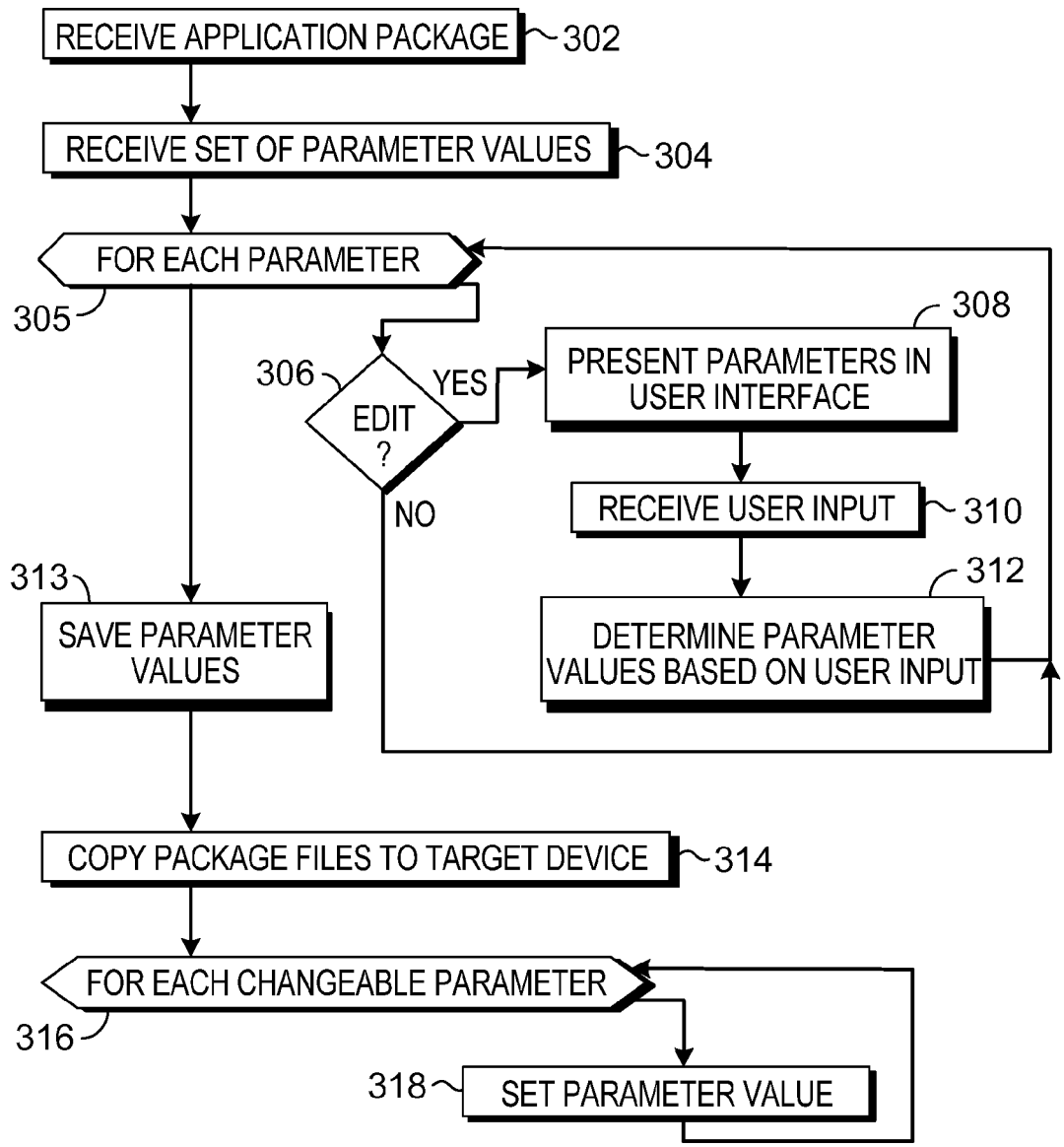
FIG. 3 is a flowchart illustration of an embodiment showing a method for installing an application package with pre-defined parameter values.

FIG. 3 is a flowchart illustration of an embodiment 300 showing a method for installing an application package where configurable parameter values are present. Embodiment 300 is a simplified example of merely one method for using an installation package with configurable parameters to perform an installation.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is similar to embodiment 200 in that user input is collected and used for installation, but embodiment 300 includes operations with a predefined set of values for the changeable parameters.

Embodiment 300 may be used where a set of predefined changeable parameters exist for an installation. An example scenario may be where an administrator may create a default set of values for changeable parameters to be used within an enterprise. The default set of values may define settings that enable an application to operate within the enterprise as defined by network and connectivity issues, licensing arrangements with the application vendor, company policies, statutory and legal definitions, or other reasons.

An application package may be received in block 302 and a set of parameter values may be received in block 304. The steps of examining the application package and determining the changeable parameters within the package are not shown, but are discussed in blocks 204 through 208 in embodiment 200.

For each parameter in block 305, if the changeable parameter can be edited in block 306, the parameter may be presented in a user interface in block 308, input received in block 310, and parameter values determined in block 312. The method may return to block 305. If the parameter may not be edited in block 306, the method may return to block 305.

In many embodiments, metadata about a changeable parameter may indicate whether or not a parameter may be edited when a predetermined set of changeable parameter values is available. In some cases, a predetermined value may be used as a default value or recommended value that may be edited by a user. In other cases, a predetermined value may not be changed by a user.

After analyzing the changeable parameters in block 305, the parameter values may be saved in block 313. In embodiments where no changes are made to the predefined parameter values, the save step of block 313 may be omitted.

After the parameters are saved in block 313, the installation process may begin. The installation process may include copying installation package files to a target device in block 314 and, for each changeable parameter in block 316, setting the parameter value in block 318. The operations of block 314-318 may be similar to those of blocks 230-234.

The installation process may operate on a target device. In some cases, the target device may be the same device on which the installation system is operating. In other cases, the target device may be a remote device that is connected to the installation system through a network connection.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving an application package, said application package comprising changeable parameters, said changeable parameters being contained in the application package;
   identifying said changeable parameters from within said application package by reading metadata that is in an uncompressed portion of said application package such that the metadata is separately readable from a compressed portion of said application package, the metadata being configured to be used for at least one of preparing a user interface, handling user input, or defining a manner in which changes to changeable parameters are implemented;
   arranging at least a portion of said changeable parameters within a user interface;
   receiving a user input for said changeable parameters from said user interface;
   determining a parameter value based on said user input;
   installing said application package, by copying said application package to a target device; and
   changing a first portion of said application package to said parameter value after said application package has been copied to said target device.

2. The method of claim 1, said application package comprising a web application.

3. The method of claim 2, said web application being installed on a remote device.

4. The method of claim 2, said web application being installed on a local device and said user interface being displayed on a remote device.

5. The method of claim 1, at least one of said changeable parameters comprising a description, said description being displayed in said user interface.

6. The method of claim 1, at least one of said changeable parameters being an optional parameter, said optional parameter being displayed when a second changeable parameter meets a first criterion.

7. The method of claim 1, said metadata comprising permissible values for a first changeable parameter, said user interface being configured to limit said user input for said first changeable parameter to said permissible values.

8. The method of claim 7, said permissible values comprising a range of values.

9. The method of claim 7, said permissible values comprising an integer number of optional values.

10. The method of claim 1 further comprising:
storing said user input for said changeable parameters in a data store.

11. The method of claim 10 further comprising:
performing a second installation by a method comprising reading said data store to retrieve said changeable parameters and performing said installing using said changeable parameters.

12. The method of claim 10 further comprising:
editing said data store to change at least one of said changeable parameters and create a second version of said changeable parameters;
storing said second version of said changeable parameters in said data store; and
performing a second installation by a method comprising reading said data store to retrieve said second version of said changeable parameters and performing said installing using said second version of said changeable parameters.

13. The method of claim 1, said first portion of said application comprising changing an entry in a database.

14. The method of claim 13, said metadata comprising a script for accessing said database, said changing an entry in said database being performed by executing said script.

15. An installation system for installing an application on a device, comprising:
a processor configured to execute instructions to
receive an application package as a file, and identify a set of changeable parameters by reading metadata that is in a separate file and is separately readable from said application package such that it may be read without loading the application package into memory, the metadata being configured to be used for at least one of preparing a user interface, handling user input, or defining a manner in which changes to the set of changeable parameters are implemented;
arrange at least a portion of said set of changeable parameters within a user interface, and receive user input for at least one changeable parameter to determine a parameter value based on said user input;
store said parameter value in a data store; and
install said application package by copying the application package to the device and change a first portion of said application package using said parameter value after the application package has been copied to the device.

16. The installation system of claim 15, said processor further configured to execute instructions to perform a second installation by reading said data store to receive stored parameter value and change said first portion of said application package using said stored parameter value.

17. A computer readable memory comprising computer executable instructions configured to perform a method comprising:
receiving an application package, said application package comprising changeable parameters, said changeable parameters contained in the application package, at least one of said changeable parameters comprising a description of said at least one changeable parameter;
identifying said changeable parameters from within the application package by scanning said application package for tags or other identifiers associated with said changeable parameters to generate metadata, said metadata being configured to be used for at least one of preparing a user interface, handling user input, or defining a manner in which changes to changeable parameters are implemented;
arranging at least a portion of said changeable parameters within a user interface, including said description from said at least one configurable parameter;
receiving a user input for said changeable parameters;
determining a parameter value based on said user input;
storing a set of said parameter values for said changeable parameters;
installing said application package on a first device to create an installed application; and
for each of said changeable parameters, changing a corresponding portion of said installed application to said parameter value.

18. The computer readable memory of claim 17 configured to operate on a second device.

19. The computer readable memory of claim 17, wherein the method further comprises storing said user input for said changeable parameters in a data store.

20. The computer readable memory of claim 19, wherein the method further comprises:
editing said data store to change at least one of said changeable parameters and create a second version of said changeable parameters;
storing said second version of said changeable parameters in said data store; and
performing a second installation by a method comprising reading said data store to retrieve said second version of said changeable parameters and performing said installing using said second version of said changeable parameters.

* * * * *